Jan. 8, 1924.
W. F. O'CONNOR
SIDE LAMP FOR VEHICLES
Filed June 24, 1920
1,480,295
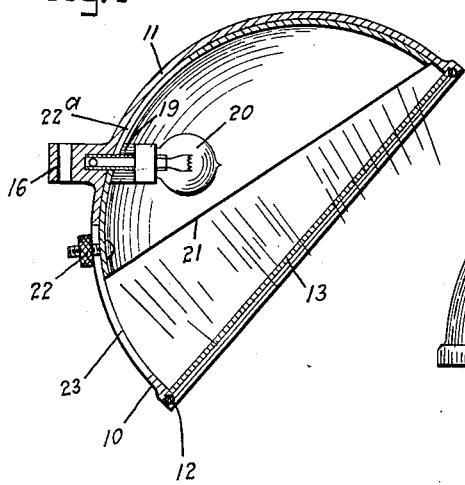
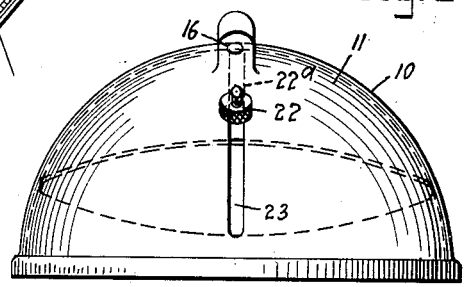
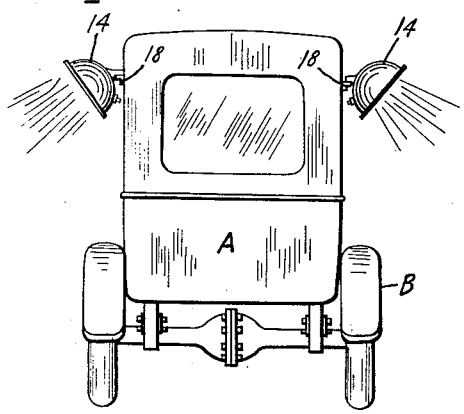
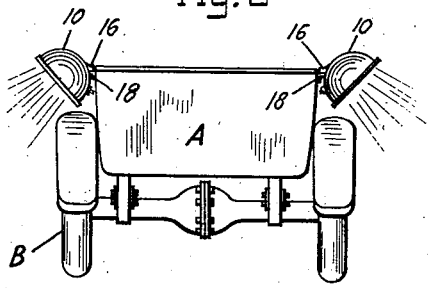
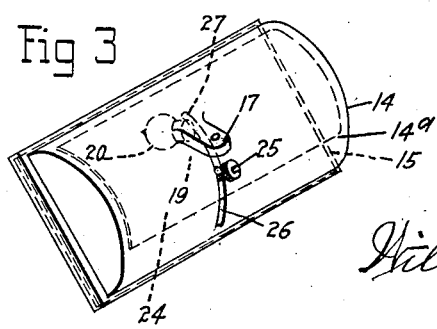
William F. O'Connor, Inventor
Attorney Patented Jan. 8, 1924.

1,480,295

UNITED STATES PATENT OFFICE.

WILLIAM F. O'CONNOR, OF TARIFFVILLE, CONNECTICUT, ASSIGNOR TO ROBBINS, GAM-WELL & COMPANY, A COPARTNERSHIP COMPOSED OF EUGENE H. ROBBINS, RICHARD H. GAMWELL, AND LORING G. ROBBINS, ALL OF PITTSFIELD, MASSACHUSETTS.

SIDE LAMP FOR VEHICLES.

Application filed June 24, 1920. Serial No. 391,444.

*To all whom it may concern:*

Be it known that I, WILLIAM F. O'CONNOR, a citizen of the United States, and a resident of Tariffville, in the county of Hartford and State of Connecticut, have invented certain new and useful Improvements in a Side Lamp for Vehicles, of which the following is a full, clear, and exact specification.

This invention relates to a class of lighting devices adapted to be used especially on vehicles.

My invention has for its object primarily to provide a lamp designed to be employed on vehicles, such as automobiles, autotrucks and the like whereby the highway along the sides of the vehicle when travelling may be lighted, in order to permit persons in front or in the back of the vehicle to observe the distance of the vehicle from one or both of the side edges of the highway so that accidents may be prevented by enabling the operator of the vehicle to avoid accidentally running into obstacles or driving down embankments as well as allowing other vehicles to safely pass particularly when travelling at night on unlighted highways, since the lamps ordinarily used on the fronts of vehicles of this class fail to illumine the highway at the sides of the vehicle, and furthermore such lamps often tend to confuse observers instead of showing whether the roadway is clear or not. The invention resides mainly in providing on one or both sides of the wall of the body of a vehicle a reflector surrounding a lamp and the reflector is positioned so that the rays of light of the lamp will illumine the highway in proximity to the sides of the vehicle. The reflector may be mounted in a stationary casing or hood so that the reflector may be adjusted relative to the lamp to cause the rays of light to be radiated various distances toward and from the sides of the vehicle.

A further object of the invention is to provide a sidelamp for vehicles of a simple and efficient construction which may be made in various sizes and shapes.

With these and other objects in view the invention will be hereinafter more fully described with reference to the accompanying drawing forming a part of this specification in which similar characters of reference indicate corresponding parts in all the views, and will then be pointed out in the claims at the end of the description.

In the drawing, Figure 1 is a detail section taken through one form of side lamp embodying my invention.

Fig. 2 is an elevation of the lamp.

Fig. 3 is a perspective view showing the rear of a different shape of the lamp.

Fig. 4 is a rear elevation of one type of automobile showing the manner of employing the lamp in conjunction therewith, and Fig. 5 is a view showing the manner of using the lamp on another type of vehicle.

The lamp has a casing or hood 10 which may be of any suitable size and shape, though the form of the casing shown in Figs. 1 and 2 has a substantially semi-spherical body part or back 11 with a window or open front 12 which is closed by a plate 13 of glass or other transparent material, while the form of the casing 14 shown in Fig. 3 has an elongated substantially semi-circular body part or back 14ª with also a window or open front in which is mounted a plate 15 of glass or other transparent material. Protruding rearwardly from the central part of the body part 11 of the casing 10 may be an apertured lug, as 16, and projecting rearwardly from the central part of the body of the casing 14 may also be an apertured lug, as 17, so that the lamps may be bracketed, as at 18, to suitable parts of the walls of the bodies, as A, of automobiles and like vehicles, as B, the lamps being arranged whereby their glass fronts are disposed on inclines, as shown. Within the casing of each lamp and projecting toward its glass front may be a socket, as 19, of a form adapted to removably carry a lamp, as 20, of any well known or preferred make designed to be lighted by electricity.

Interiorly of the casing 10 is a reflector 21 which is approximately semi-spherical of a size so that it fits closely the concavity of the body part 11 of the casing, while being somewhat smaller than the body part as well as surrounding the lamp 20. The reflector illustrated is movable within the casing, and to allow the reflector to be adjusted upwardly and downwardly in the casing, on part of its lower edge portion is a bolt or handle, as 22, while in the reflector above the handle is a slot 22ª through which the stem of the socket 19 extends, and this slot is of a width to permit the reflector to be moved. The handle 22 protrudes through a slot 23 extending in the casing 10 from proximity to the lug 16 to contiguity to the lower edge of the casing. Within the casing 14 is a curved reflector 24 which conforms to the shape of the inner surface of the body part 14$^a$ of this casing, and this reflector is of a width somewhat smaller than the width of the body part, besides being in movable contact with the body part. At the lower edge of the body part 14$^a$ of the reflector 24 is a bolt or handle, as 25, which movably protrudes through a slot 26 extending downwardly in the body part of the casing 14 from spaced proximity to the lug 17 to or near the lower edge of the body part. In the reflector 24 above the handle 25 is also a slot 27 through which the stem of the lamp socket 19 extends, and this slot is of a width to allow the reflector to be moved over the socket stem when the reflector is adjusted. The reflector of my lamp may be of mirrored glass or highly polished metal, and as above explained, the lamp is applied to a vehicle so that its glass front is on an incline in opposed relation to the highway under the vehicle. When travelling over country roads especially at night the highway at both sides of the vehicle may be illumined for suitable distances by moving the handle of the reflector upwardly or downwardly in the casing of the lamp for suitably adjusting the reflector whereby the rays of light of the lamp will be radiated the required distance from the sides of the vehicle so that the operator may observe at all times the existence of any dangerous parts or obstacles alongside of the road. Moreover, by the employment of lamps in this manner the persons of other vehicles approaching from the rear or front may observe if the space of the road at the sides of the vehicle is sufficient to allow safe passing or not.

In the foregoing description, I have embodied the preferred form of my invention, but I do not wish to be understood as limiting myself thereto, as I am aware that modifications may be made therein without departing from the principle or sacrificing any of the advantages of this invention, therefore, I reserve to myself the right to make such changes as fairly fall within the scope thereof.

Having thus described my invention, I claim as new and desire to secure by Letters Patent:—

A side lamp for a vehicle, including a substantially semi-spherical casing with a window and having on its interior a fixed socket disposed toward the center of the window, an approximately semi-spherical reflector movable on the inner surface of the wall of the casing surrounding the socket, said reflector having a slot through which the socket is disposed to allow the reflector to be adjusted upwardly and downwardly, and a handle protruding from the reflector through a slot in the casing so that the reflector may be manually adjusted from the exterior of the casing.

This specification signed and witnessed this 23d day of June A. D. 1920.

WILLIAM F. O'CONNOR.

Witnesses:
 E. BACKER,
 J. FREDERICK CRYER.